United States Patent [19]

Kojima et al.

[11] Patent Number: 5,741,608

[45] Date of Patent: Apr. 21, 1998

[54] MULTI-LAYER TYPE NONAQUEOUS ELECTROLYTE SECONDARY CELL

[75] Inventors: Kazuya Kojima; Yasuo Yukita; Nobuhiro Fujiwara, all of Kanagawa; Yukio Noda, Tokyo, all of Japan

[73] Assignee: Sony Corporation, Tokyo, Japan

[21] Appl. No.: 766,574

[22] Filed: Dec. 12, 1996

[30] Foreign Application Priority Data

Dec. 12, 1995 [JP] Japan .................. 7-323257

[51] Int. Cl.⁶ .................. H01M 2/16; H01M 10/40
[52] U.S. Cl. .................. 429/94; 429/144; 429/152; 429/194
[58] Field of Search .................. 429/144, 136, 429/139, 131, 252, 254, 94, 194, 152, 251

[56] References Cited

U.S. PATENT DOCUMENTS

| | | | |
|---|---|---|---|
| 3,853,627 | 12/1974 | Lehmann et al. | 429/144 |
| 4,621,035 | 11/1986 | Bruder | 429/152 |
| 5,443,925 | 8/1995 | Machida et al. | 429/94 |
| 5,631,102 | 5/1997 | Spillman et al. | 429/94 |

*Primary Examiner*—Anthony Skapars
*Attorney, Agent, or Firm*—Hill, Steadman & Simpson

[57] ABSTRACT

Internal shorting of large capacity multi-layer type nonaqueous electrolyte secondary cells is minimized by inclusion of heat resistant porous film layers adjacent thermally fusible resin microporous films disposed between negative electrodes and positive electrodes in an electrode assembly and between adjacent electrode assemblies stacked together to provide an electrode stack. The heat resistant porous film layers may be organic or inorganic temperature resistant sheet materials exhibiting heat resistance to temperatures of at least about 600° C.

20 Claims, 6 Drawing Sheets

MULTI-LAYER TYPE NONAQUEOUS ELECTROLYTE SECONDARY CELL

BACKGROUND OF THE INVENTION

The present invention relates to a multi-layer type nonaqueous electrolyte secondary cell such as a large-capacity lithium ion secondary cell suitably used for electric vehicles, uninterruptible power supplies (UPS), load leveling machines, and the like.

Lithium ion secondary cells including multi-layer type nonaqueous electrolyte secondary cells have been under research and development in a number of fields as a possible solution to environmental problems such as for example as a power source for electric vehicles, UPS and road leveling machines. There is a great demand for a lithium ion secondary cell having a large capacity, high output, high voltage and long shelf life.

In a charged lithium ion secondary cell, lithium ions within an active material of the positive electrode dissolve in the electrolyte, pass through a separator, and penetrate into the active material of the negative electrode. During discharging, the lithium ions penetrated into the active material of the negative electrode dissolve to the electrolyte and return to the active material of the positive electrode. In this way, the charging-discharging operation is performed.

In most of the conventional small-sized lithium ion secondary cells, in order to improve the energy density, an active material is coated on the two sides of a metal foil collector to provide a sheet-like positive electrode and a sheet-like negative electrode. A plurality of separators of thermally-fusible polyethylene or polypropylene resin are disposed between a cathode and an anode to provide an electrode pair and a multiplicity of electrode pairs of predetermined size are stacked to form a rectangular cell. Alternatively, long positive and negative electrodes may be wound together with a plurality of polyethylene or polypropylene separators to form a cylindrical cell structure.

Generally, the above-mentioned small-sized lithium ion cells have a capacity of not more than several Ah. If a shorting occurs in or outside of the cell, the internal temperature of the cell increases, and the separators constituting a micro-porous film of polyethylene or polypropylene are fused by heat. As a result, the pores are closed and shut off the flow of ions between the electrodes. After a time, the shorting current is reduced and heat generation is suppressed.

In the case of large capacity lithium-ion secondary cells constructed of a plurality of layers of positive and negative electrodes each including a collector with active material coated on the sides thereof, similar to the above-mentioned small-sized lithium ion secondary cell, heat may be generated by an internal shorting. The separator of thermally fusible resin between adjacent positive and negative electrodes is thermally fused, thereby enlarging the internal shorting. As a result, a great amount of heat is released to the environment, often blowing out a great amount of gas.

Generally, a test simulating an internal shorting is conducted in which a nail is pierced from outside of the cell to artificially short the positive and negative electrodes. The present inventor has found that when a large-capacity lithium ion secondary cell is pierced by nail, a great amount of gas is blown out and the heat due to the resistance of the pierced portion constitutes a fire source. Consequently, the separator between adjacent positive and negative electrodes is thermally fused. The direct reaction between the positive and negative electrodes generates heat, followed by thermal fusion of the separator between the adjacent electrodes. In this way, heat is generated sequentially, finally leading to a great amount of heat being generated by the reaction among all the electrodes.

SUMMARY OF THE INVENTION

In view of these problems, an object of the present invention is to provide a multi-layer type nonaqueous electrolyte secondary cell, in which an internal shorting of a cell, such as the large-capacity lithium ion secondary cell, is prevented from affecting adjacent positive and negative electrodes thereby minimizing the damage to the cell and the environment.

In accordance with its first embodiment, the present invention provides a multi-layer type nonaqueous electrolyte secondary cell comprising a negative electrode, a thermally fusible resin micro-porous film, and a positive electrode, in stacked relationship to form an electrode stack. A heat resistant porous film comprising at least one layer of an organic or an inorganic material is disposed adjacent to said thermally fusible resin micro-porous film.

According to this invention, there is provided a multi-layer type nonaqueous electrolyte secondary cell, in which a heat-resistant porous film of, for example, an organic or an inorganic material is disposed adjacent to the whole or part of a thermally fusible resin micro-porous film. The heat resistant porous layer has a heat-resistance temperature of 600° C. or higher. The heat resistant porous layer is not thermally fused or decomposed when an internal shorting occurs in a large-capacity multi-layer type nonaqueous electrolyte secondary cell. As a result, the enlargement of shorting is prevented, thereby minimizing the damage to the cell and the environment.

DETAILED DESCRIPTION OF THE PREFERRED EMBODIMENTS

Now, explanation will be made about a multi-layer type nonaqueous electrolyte secondary cell according to an embodiment of the invention as applied to a lithium ion secondary cell with reference to FIGS. 1, 2 and 3.

Figure 2:
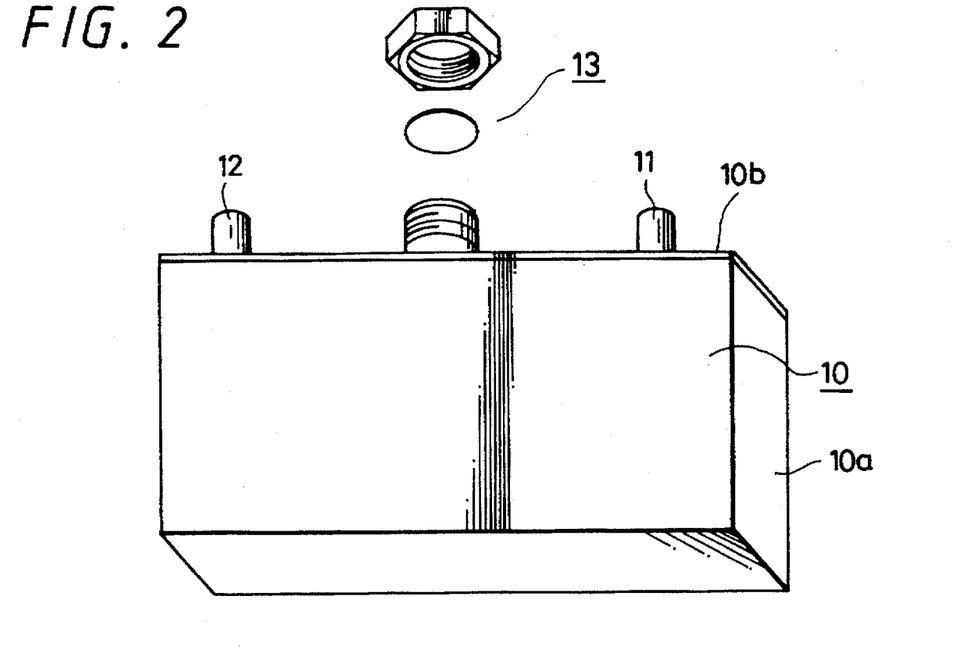
FIG. 2 is a perspective view of a lithium ion secondary cell of flat type in accordance with the invention.
Figure 3:
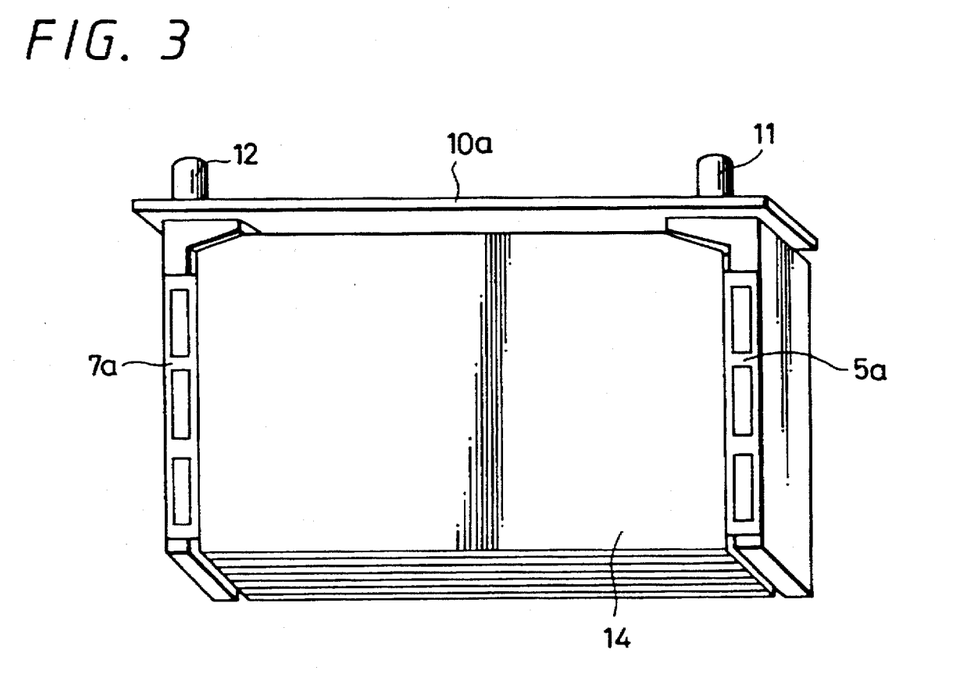
FIG. 3 is a perspective view of interior components of the flat type lithium ion secondary cell of FIG. 2.

In FIGS. 2 and 3, numeral 10 designates a flat-type rectangular cell case, which is made of a stainless steel plate having a thickness of, for example, 300 μm. The flat rectangular cell case 10 includes a cell case body 10a having length dimension, l, of about 300 mm, a height dimension, h, of about 115 mm and a width dimension, w, of about 22 mm, and an upper cover 10b made of a stainless steel plate having a thickness of 1.5 mm.

Figure 1:
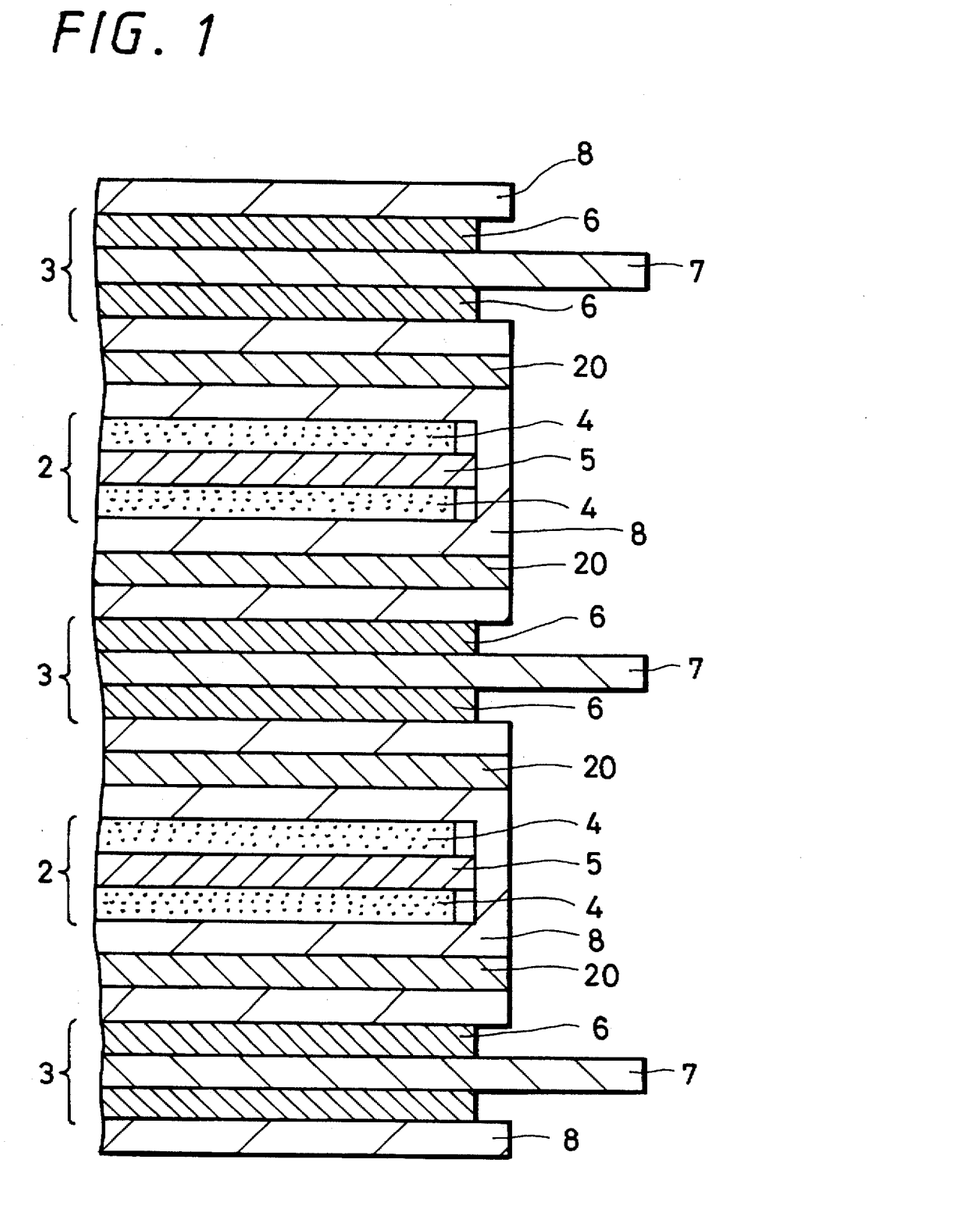
FIG. 1 is an enlarged crossectional view showing the essential parts of a multi-layer type nonaqueous electrolyte secondary cell in accordance with an embodiment of the present invention.

In the flat-type rectangular cell case 10, as shown in FIG. 1, a plurality of positive electrode units each including a sheet of positive electrode 2 encased in a bag-shaped separator 8 of a micro-porous film of a thermally fusible resin, and a plurality of negative electrode units each including a sheet of negative electrode 3 encased in the bag-shaped separator 8 of a micro-porous film of a thermally fusible resin. The positive electrode units and the negative electrode units are alternately stacked with a plurality of intermediate heat-resistant porous films 20 placed therebetween. The resulting electrode stack 14 (refer to FIG. 3) is encased in the flat-type rectangular cell case 10.

The positive electrode 2 is fabricated in the manner described below. Lithium carbonate and cobalt carbonate are mixed together to provide a mol ratio Li/Co=1, and baked in air for 5 hours at 900° C. thereby to synthesize a positive active material ($LiCoO_2$). This positive active material is crushed in an automatic crushing bowl thereby to produce $LiCoO_2$ powder. 95 weight % of the prepared $LiCoO_2$ powder and 5 weight % of lithium carbonate are mixed. 91 weight % of this mixture is further mixed with 6 weight % of graphite as a conductive material and 3 weight % of polyvinylidene fluoride as a binder thereby to produce an active cathode material. The active cathode material is dispersed in N-methyl-2'-pyrrolidone to form a slurry. The slurry is coated on the both sides of a band-shaped aluminum foil constituting a positive collector 5 (refer to FIG. 1) except for the leads thereof. This positive electrode assembly, after being dried, is formed by compression in a roller press thereby to prepare a sheet of positive electrode 2 coated with the active cathode material 4 on both sides of a positive collector 5.

The negative electrode 3 is prepared as described below. A petroleum pitch, is used as a starting material, then oxygen is introduced into the petroleum to provide about 10 to 20% of functional groups (in what is called the oxygen cross-linking). After that, the material is baked at 1000° C. in an inactive gas, thus producing a non-graphitizable carbon material similar in property to glass carbon.

90 weight % of this carbon material constituting a negative active material is mixed with 10 weight % of polyvinylidene fluoride as a binder to prepare an active anode material for the negative electrode. The active anode material is dispersed into N-methyl-2-pyrrolidone to form a slurry. This slurry is coated on the both sides of a band-shaped copper foil constituting a negative collector 7 (refer to FIG. 1) except for the lead sections. This anode assembly, after being dried, is formed by compression in a roller press, thereby producing a sheet of negative electrode 3 with the active anode material 6 coated on the two sides of the negative collector 7.

This sheet of positive electrode 2 is cut or punched in such a manner that the size of the portion coated with the positive active cathode material 4 is, for example, 107 mm×265 mm. The portion of the punched positive electrode 2 coated with the active cathode material 4 is encased in a bag-shaped separator 8 (refer to FIG. 1) made from two mutually-attached sheets of polyolefin micro-porous films such as polypropylene constituting a thermally fusible resin micro-porous film having a thickness of 25 μm and a size of 112 mm by 273 mm, thus completing a positive electrode unit. In this case, the lead section 5a (refer to FIG. 3) of the positive electrode 2 is exposed from the separator 8.

The negative electrode 3 in sheet form is punched in such a manner that the portion thereof coated with the active anode material 6 sections is, for example, 109 mm×270 mm in size. The portion of the negative electrode 3 coated with the active anode material 6 is encased in a bag-shaped separator 8 having two mutually-attached thermally fusible resin micro-porous films of polyolefin group such as polypropylene 25 μm thick and 112 mm by 273 mm in size, thereby constituting a negative electrode unit. In this case, the lead section 7a of the negative electrode 3 is exposed from the separator 8.

The heat-resistant porous film 20, shown in FIG. 1, is prepared as described below. In this example, a polyimide film (Capton® brand, for example) about 25 μm thick having a heat-resistance temperature of about 800° C. is punched in a press to provide an apertured polyimide punched film having a plurality of holes of about 0.8 mm in size arranged at 1.27 mm pitch or spacing over the entire surface. The apertured film in turn is punched into the size of 109 mm by 270 mm, thereby producing a heat-resistant porous film 20.

47 negative electrode units, 46 positive electrode units and 92 heat-resistant porous films 20 are sequentially stacked in the order of a negative electrode unit, a heat-resistant porous film 20, a positive electrode unit, a heat-resistant porous film 20, a negative unit, and so on. In this way, a rectangular parallelopipedal electrode stack 14 is formed as shown in FIG. 3. In this case, the lead sections 5a of the positive electrodes 2 extend from one side of the electrode stack and the lead sections 7a of the negative electrodes 3 extend from the other side of the electrode stack.

Also, as shown in FIG. 3, one side of the electrode stack 14, i.e., the lead sections 5a exposed from the separator 8 of the positive electrodes 2 are welded by ultrasonic methods to the positive terminal 11 of aluminum in parallelopipedal form. Further, the other side of the electrode stack 14, i.e., the lead sections 7a of the negative electrodes 3 exposed from the separator 8 are welded by ultrasonic methods to the negative terminal 12 of copper in parallelopipedal form.

The outer periphery of the electrode stack 14 with the positive terminal 11 and the negative terminal 12 welded thereto as shown in FIG. 3 is covered with an insulating sheet of a 125 μm thick polyimide film. The resulting assembly is bolted to the upper cover 10b by means of the positive terminal 11 and the negative terminal 12 through an O-ring and an insulating ring (not shown in FIG. 3). After that, the assembly is inserted in the cell case body 10a, and the upper cover 10b is fixedly laser-welded to the cell case body 10a.

After assembly, a non-aqueous organic electrolyte including a solvent mixture of propylene carbonate and diethyl carbonate in which LiPF6 is dissolved in the ratio of 1 mol/l is injected into the flat rectangular cell case 10.

Also, a safety valve 13 is arranged on the upper cover 10b to drain off internal air in case the internal pressure of the enclosed flat rectangular cell case 10 increases beyond a predetermined level.

In the lithium ion secondary cell in accordance with this embodiment, the heat-resistant porous film 20 with a plurality of holes 0.8 mm in size regularly spaced at 1.27 mm pitch has an ion transmissibility, and thus it is possible to produce a lithium ion secondary cell of a capacity as large as 53 Ah.

In accordance with this embodiment, a heat-resistant porous film 20 comprising polyimide having a heat-resistance temperature of 800° C. is arranged between each pair of the negative electrode units and the positive electrode units. Even when an internal shorting occurs, therefore, the polyimide heat-resistant porous film 20 is not thermally fused or decomposed, so that an enlargement of the internal shorting is prevented, thereby minimizing the damage to the cell and the environment.

Research performed by the inventors on the heat-resistance temperature of the heat-resistant porous film 20 has shown that if the internal shorting is to be prevented from spreading, the large-capacity lithium ion secondary cell as described above desirably requires a heat resistance temperature of at least 600° C. for the practical type having a thickness of 200 µm or less, or preferably 50 µm or less, depending on the thickness of the heat-resistant porous film 20. The heat-resistance temperature of 800° C. or higher is preferred.

Further, in the above-mentioned example, the heat-resistant porous film 20 is disposed between separators 8 composed of a micro-porous film of thermally-fusible polyolefin resin. When an external shorting occurs, the minute pores of the separator 8 of polyolefin resin are closed (shut down) with the increase of the battery temperature to prevent an enlargement of the internal shorting. As a result, the charge transfer of lithium ions is prevented between the electrodes for a reduced discharge current, thereby leading to the advantage that an excess energy is not released.

A nailing test was conducted on the above-mentioned lithium ion secondary cell. The result of this nailing test is shown in Table 1, as follows:

TABLE 1

Comparative Weight Reductions for
Secondary Cells After External Shorting

| EXAMPLE | Heat Resistant Porous Film | Weight Reduction, % |
| --- | --- | --- |
| Embodiment 1 | Polyimide punching film | 18 |
| Embodiment 2 | Polyamide fibrous paper | 24 |
| Embodiment 3 | Fluoric resin film + almina particles | 23 |
| Embodiment 4 | Alumina fiber cloth | 17 |
| Embodiment 5 | Mica porous film | 20 |
| Embodiment 6 | Glass fiber cloth | 18 |
| Reference |  | 128 |

Figure 7:
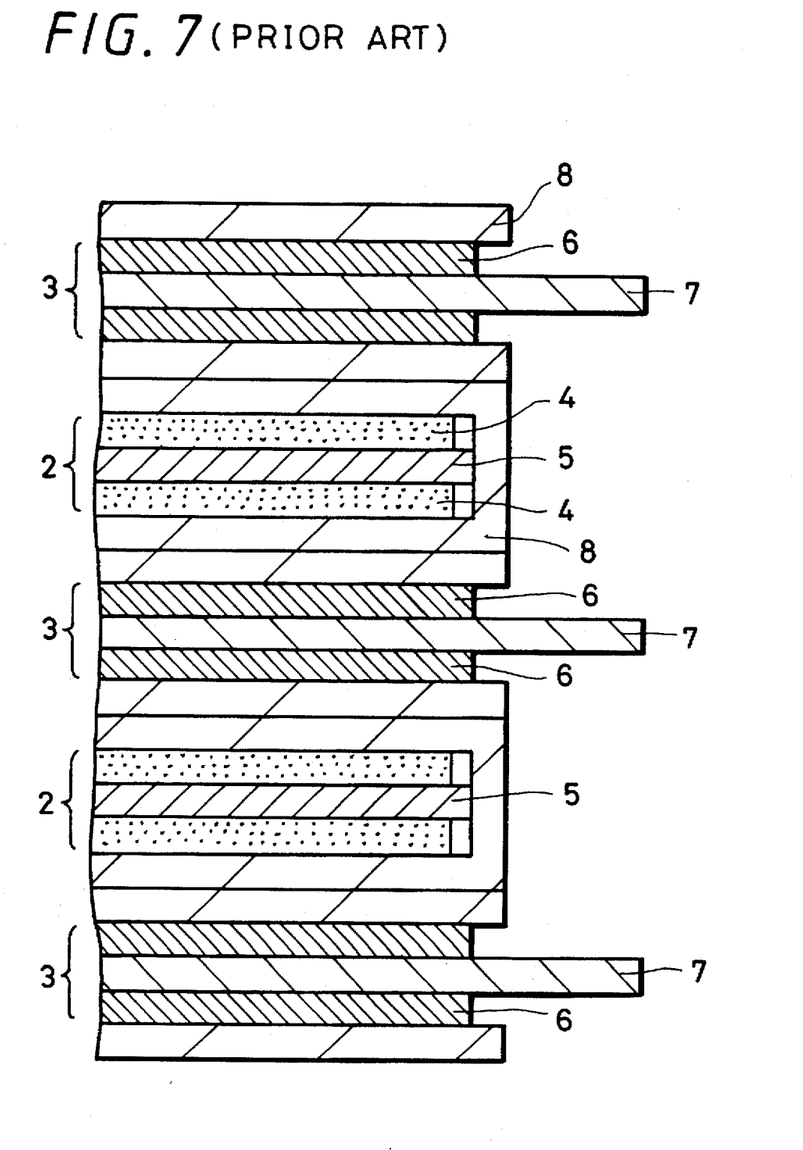
FIG. 7 is an enlarged view showing the essential parts of an example of a conventional lithium ion secondary cell.

In Table 1, the weight reduction represents the percentage of the weight reduction of the cell after nailing against the weight of cell before nailing. The smaller the weight reduction, the smaller amount of gas that blows out. According to the first embodiment, the gas blows out in a comparatively small amount of 18%. As a comparative embodiment, 46 positive electrode units and 47 negative electrode units are stacked sequentially as in the first embodiment, without the heat-resistant porous film, as shown in FIG. 7 to form an electrode stack 14. The other parts of the configuration are the same as the corresponding parts of the first embodiment. In this way, a lithium ion secondary cell with a capacity of 53 Ah was obtained and subjected to a nailing test.

The result of the nailing test conducted on the comparative embodiment is shown in Table 1. As shown, the weight reduction is large at 128%. An internal shorting occurs and the heat generated reaches the adjacent electrodes. Not only the electrolyte but also a part of the cell materials including the separator are blown out.

The second embodiment shown in Table 1 is a lithium ion secondary cell, in which each of a plurality of heat-resistant porous films 20 according to the first embodiment is made of aromatic polyamide fiber such as polyaramid fiber (Technora) with a heat-resistance temperature of 600° C. or higher and heat-treated to produce a wet unwoven fiber web or paper 50 µm thick. The structure of the other parts are the same as those of the lithium ion secondary cell of the first embodiment.

The polyaramid fibrous paper constituting the heat-resistant porous film 20 has a heat-resistance temperature of 600° C. or higher. The nailing test conducted on the second embodiment, as seen from Table 1, shows that the weight reduction is a comparatively small 24% with substantially the same effect as in the first embodiment.

In the third embodiment shown in Table 1, the heat-resistant porous film 20 is a porous film containing powder with a 30% porosity and 50 µm thick, obtained by heating, hardening and rapidly extending the suspension of the polytetrafluoroethytene powder constituting a thermoplastic fluoropolymer and alumina powder 10 µm in average particle size. The heat-resistance temperature of the fluoropolymer porous film containing the alumina powder is 600° C. or higher. The other parts of the configuration are identical to those for the lithium ion secondary cell in the first embodiment.

The fluoropolymer porous film containing alumina powder constituting the heat-resistant porous film 20 mentioned above has a heat-resistance temperature of 600° C. or higher. A nailing test conducted on the third embodiment shows as in Table 1 that the weight reduction is a comparatively small 23%. The effect similar to the first embodiment thus is obtained for the third embodiment.

The fourth embodiment shown in Table 1, on the other hand, represents the heat-resistant porous film 20 of the first embodiment made up of an alumina fiber cloth providing an inorganic fiber with a heat-resistance temperature of at least 800° C. This alumina fiber cloth is obtained in such a manner that powder mixture in the ratio of $Al_2O_3:SiO_2:B_2O_3 = 68:27:5$ is dispersed in water, and the resulting suspension is dropped through a nozzle, dried and baked. In this way, a bundle of 80 filaments 11 µm in diameter is obtained. The filament bundle thus obtained is woven into an alumina fiber cloth 80 µm in thickness. The other component parts of the lithium ion secondary cell are identical to the corresponding parts in the first embodiment.

The alumina fiber cloth constituting this heat-resistant porous film 20 has a heat-resistance temperature of at least 800° C. A nailing test conducted on the fourth embodiment shows, as seen from Table 1, that the weight reduction is a comparatively small 17%, indicating that substantially the same effect and advantage are obtained as in the first embodiment.

Figure 4:
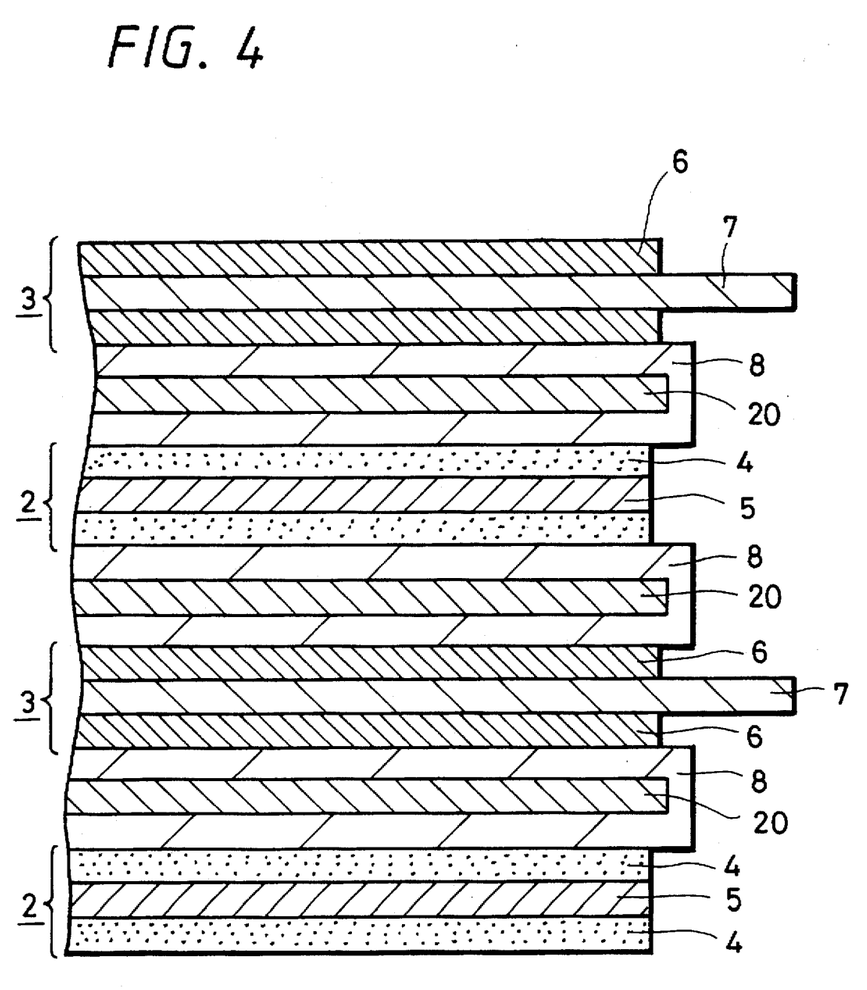
FIG. 4 is an enlarged plan view partially in section showing the essential parts according to another embodiment of the invention.

In the fifth embodiment shown in Table 1, an electrode stack 14 inserted into the flat rectangular cell case 10 is configured, as shown in FIG. 4, in such a manner that the positive electrode 2 and the negative electrode 3 in sheet form are laid one on another through a heat-resistant porous film unit including heat-resistant porous films 20 encased in the bag-shaped separator 8 made up of a thermally fusible resin micro-porous film.

According to this fifth embodiment, the positive electrode 2 and the negative electrode 3 are formed in a manner similar to the first embodiment. Also, the heat-resistant porous film 20 is fabricated in the manner mentioned below. A hard mica block is crushed in a wet environment to a grain thickness of 0.49 μm. The resulting powder is classified using a strainer. The powder of grain size of 60M to 80M (M: mesh) in 4.5%, the grain size of 80M to 140M in 40.8%, the grain size of 140M to 200M in 7.2% and the grain size of 200M or more in 47% are used to make a composite mica sheet 34 μm thick.

The mica sheet thus obtained is soaked with the N-methyl-2-pyrrolidone solution of polyvinylidene fluoride (PVDF), so that the N-methyl-2-pyrrolidone is rapidly vaporized as a foaming process, thereby producing a mica micro-porous film 20 having a thickness size of 50 μm. This mica micro-porous film 20 is punched to the size of 109 mm×270 mm. The resulting assembly is encased in a bag-shaped separator 8 with two mutually-attached polyolefin micro-porous films such as polypropylene constituting a thermally fusible resin micro-porous film having a thickness of 25 μm and a size of 112 mm by 273 mm, thus completing a heat-resistant porous film unit.

In this fifth embodiment, the negative electrode 3, the heat-resistant porous film unit, the positive electrode 2, the heat-resistant porous unit, the negative electrode 3 and so on, are sequentially stacked for a total of 41 negative electrodes, 40 positive electrodes 2 and 80 heat-resistant porous film units thereby to form a parallelopipedal electrode stack 14 as shown in FIG. 3. In the process, the assembly is formed in such a manner that the lead section 5a of the positive electrode 2 is situated on one side, and the lead section 7a of the negative electrode 3 on the other side.

The configuration of the other component parts is similar to the corresponding one of the first embodiment. In this way, a lithium ion secondary cell having a capacity of 46 Ah is obtained.

The mica micro-porous film constituting this heat-resistant porous film 20 according to the fifth embodiment has a heat-resistance temperature of at least 800° C. A nailing test conducted on the fifth embodiment, as seen from Table 1, shows that the weight reduction is comparatively small at 20%. It will be easily understood that a similar effect is obtained in this fifth embodiment as in the first embodiment described above.

The sixth embodiment, as seen from Table 1, shows an example of a cylindrical lithium ion secondary cell. For fabricating the lithium ion secondary cell according to the sixth embodiment, an active cathode material 4 is coated on the both sides of a positive collector 5, 280 mm by 1745 mm in size, to make a band-shaped positive electrode 40 as in the first embodiment. Then, a band-shaped negative electrode 41 is fabricated in a similar manner as the first embodiment by coating an active anode material 6 on the sides of a negative collector 7, 283 mm by 1750 mm in size.

Also, in this example, a heat-resistant porous film unit 20a having a size of 287 mm by 1755 mm is prepared in a form disposed between two sheets of polyolefin resin micro-porous film such as separators 8 comprising polypropylene constituting a thermally fusible resin micro-porous film 25 μm thick.

According to the sixth embodiment, the heat-resistant porous film 20 is made of glass fiber woven with the density of 78 strands per inch (warp) and 73 strands per inch (weft). In this way, a glass fiber cloth having a thickness of 51 μm and a porosity of 11% is obtained.

Figure 5:
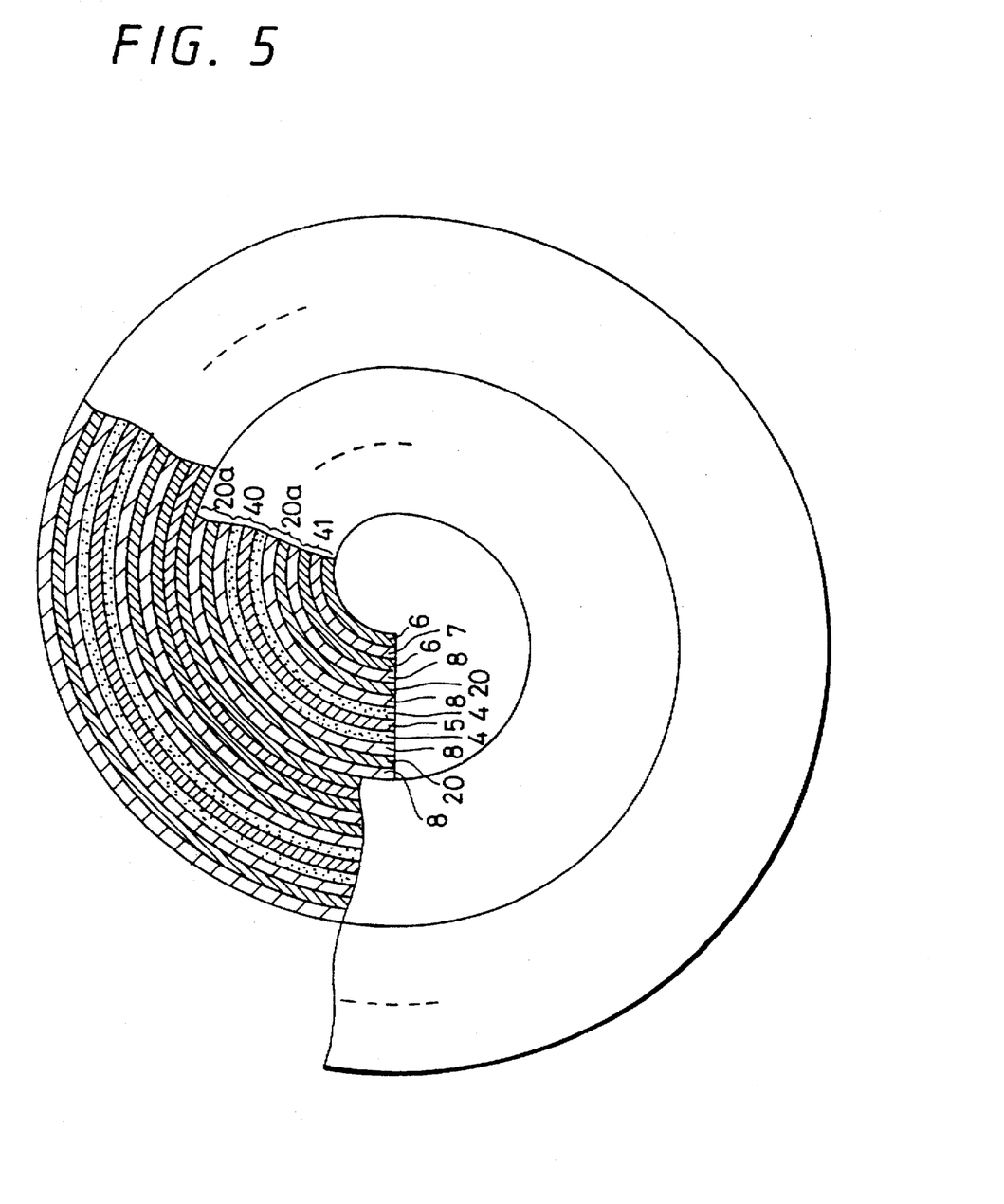
FIG. 5 is enlarged crossectional view showing the essential parts according to another embodiment of the invention.

In the sixth embodiment, as shown in FIG. 5, the negative electrode 41, the heat-resistant porous unit 20a including a separator layer 8, heat resistant porous layer 20 and another separator layer 8, the positive electrode 40, a heat-resistant porous unit 20a and so on, are laid on one another in this order. The resulting assembly is wound by a predetermined number of turns in spiral form along the longitudinal direction thereby to form a spiral stack 44.

Figure 6:
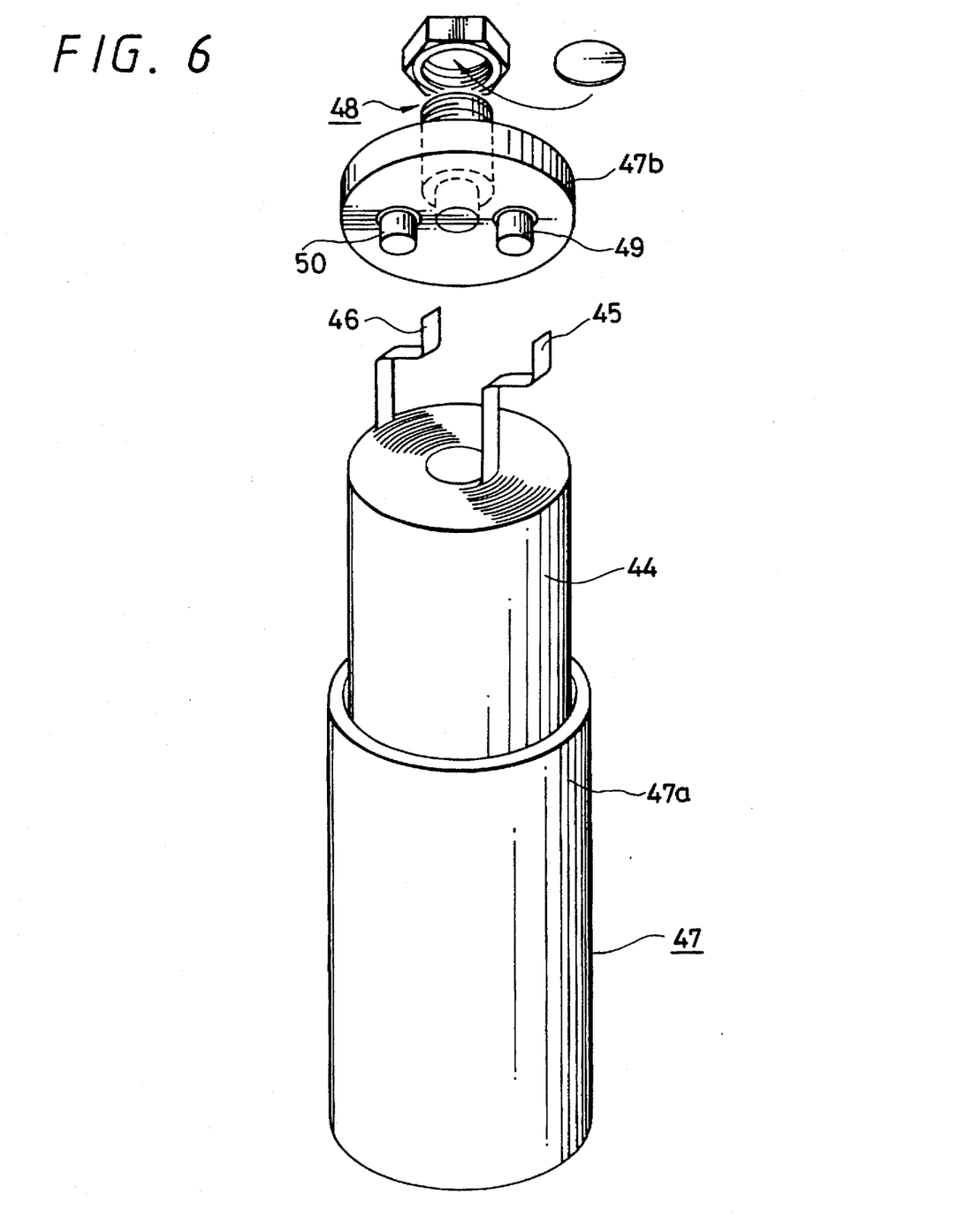
FIG. 6 is an exploded perspective view showing an example of a cylindrical lithium ion secondary cell.

Also, according to this example, as shown in FIG. 6, an end of the negative lead 45 made of nickel is fused by resistance welding to the lead section on one side of the negative electrode 41. At the same time, the lead section on one side of the positive electrode 40 is fused by resistance welding to an end of the positive lead 46 made of aluminum.

A nickel-plated cylindrical cell can 47a of iron having a diameter of 50 mm and a height of 300.5 mm is prepared. After an insulating plate is inserted into the bottom of the cell can 47a, as shown in FIG. 6, a spiral stack 44 is inserted into the cell can 47a. In the process, the negative terminal 49 and the positive terminal 50 arranged on the cell cover 47b are welded to the other end each of the negative lead 45 and the positive lead 46, respectively.

An electrolyte dissolved with LiPF6 at the rate of one mol/l in a solvent mixture of 50 vol % of polypropylene carbonate and 50 vol % of diethyl carbonate is injected into the cell can 47a. After that, the cell cover 47b is caulked to the cell can 47a through an insulating seal gasket coated with asphalt. With the cell cover 47b fixed this way, a cylindrical large-capacity lithium ion secondary cell having a capacity of 20 Ah is completed.

Also, the cell cover 47b may have a safety valve 48 for draining off the internal air when the internal pressure of the hermetic cell case 47 rises beyond a predetermined level.

As will be readily understood, according to the sixth embodiment, the heat-resistant porous film 20 is interposed between the positive electrode 40 and the negative electrode 41 along the diameter of the spiral stack 44. The heat-resistant porous film 20 is made of glass fiber cloth having a heat-resistance temperature of at least 800° C. A nailing test conducted on this sixth embodiment shows, as seen from Table 1, that the weight reduction is a comparatively small 18%. It is thus seen that substantially the same effect is obtained in this embodiment as in the first embodiment.

The heat-resistant porous film according to the invention is not limited to the one used in the above-mentioned embodiments, but any type of heat-resistant porous film may be used so long as it has a heat-resistance temperature of 600° C. or higher and can be formed comparatively thin to form multi-layer type nonaqueous cell.

Also, although the heat-resistant porous film is inserted between every pair of the positive electrodes and the negative electrodes according to this embodiment, each heat-resistant porous film may be interposed at intervals of every other pair or several pairs of the positive and negative electrodes. In such a case, too, substantially the same effect can be obtained as in the aforementioned embodiments, as will be easily understood.

Further, instead of applying the invention to a lithium ion secondary cell as described in the foregoing embodiments, the invention is of course applicable to alternative multi-layer type nonaqueous electrolyte secondary cells.

Furthermore, the present invention may assume various modifications without departing from the spirit and scope thereof.

It will thus be understood that according to the present invention, a heat-resistant porous film of polyimide, polyamide, inorganics or organics can be arranged adjacently to the whole or part of a thermally fusible resin micro-porous film. The heat-resistance temperature of these components is at least 600° C., so that an internal shorting, which may occur in a large-capacity multi-layer type non-aqueous electrolyte secondary cell, is prevented from spreading for lack of thermal fusion and decomposition. Furthermore, in the process, the thermally fusible resin micro-porous film is fused to enclose (shut down) the micro-probes. Therefore, the charge transfer of lithium ions between the electrodes is prevented for a reduced discharge current with a smaller release of excess energy, thereby minimizing the damage to the cell and the effect on the environment.

What is claimed is:

1. A multi-layer nonaqueous electrolyte secondary cell comprising:

a negative electrode, a thermally fusible resin microporous film, and a positive electrode disposed in stacked relation to form an electrode stack, said electrode stack further comprising a heat resistant porous film layer disposed in said electrode stack adjacent the thermally fusible resin microporous film, said heat resistant porous film layer comprising an inorganic or an organic temperature resistant sheet material exhibiting heat resistance to temperatures of at least about 600° C.

2. A secondary cell as defined in claim 1, wherein said heat resistant porous film layer is an inorganic layer comprising a woven or nonwoven sheet of inorganic fibers.

3. A secondary cell as defined in claim 1, wherein said heat resistant porous film layer is an inorganic layer comprising a sheet of scale-like particles.

4. A secondary cell as defined in claim 1, wherein said heat resistant porous film layer is an inorganic layer comprising mica particles.

5. A secondary cell as defined in claim 1, wherein said heat resistant porous film layer is an inorganic layer comprising glass fibers.

6. A secondary cell as defined in claim 1, wherein said heat resistant porous film layer is an inorganic layer comprising alumina fibers.

7. A secondary cell as defined in claim 1, wherein said heat resistant porous film layer is an organic layer comprising polyimide.

8. A secondary cell as defined in claim 1, wherein said heat resistant porous film layer is an organic layer comprising polyamide.

9. A secondary cell as defined in claim 1, wherein said heat resistant porous film layer comprises a fluoropolymer and finely-divided inorganic powder.

10. A secondary cell as defined in claim 1, wherein said heat resistant porous film layer has a thickness of 200 μm or less.

11. A secondary cell as defined in claim 1, wherein the thermally fusible resin microporous film has a bag-shaped configuration including a pair of opposed sheets fused together along three edge portions thereof to define an open side and inner pocket and said heat resistant porous film layer is disposed in said inner pocket.

12. A secondary cell as defined in claim 1, wherein a plurality of thermally fusible resin microporous films are provided, each thermally fusible resin microporous film having a bag-shaped configuration including a pair of opposed sheets fused together along three edge portions thereof to define an open side and an inner pocket therein and said negative electrode is disposed in the inner pocket of a first thermally fusible resin microporous film and said positive electrode is disposed in the inner pocket of a second thermally fusible resin microporous film and said heat resistant porous film layer is disposed intermediate adjacent surfaces of said first and second thermally fusible resin microporous films.

13. A multi-layer nonaqueous electrolyte secondary cell comprising:

a plurality of stacked electrode assemblies having a heat resistant porous film layer disposed between each pair of adjacent electrode assemblies in said stacked plurality of electrode assemblies, each electrode assembly comprising a first thermally fusible resin microporous film envelope having an inner pocket defined therein, a negative electrode disposed in the inner pocket of said first envelope; a second thermally fusible resin microporous film envelope having and inner pocket defined therein; a positive electrode disposed in the inner pocket of said second envelope, said second envelope being disposed in stacked overlying relation on said first envelope; and a heat resistant porous film layer disposed between the first and the second envelopes, said heat resistant porous film layers each comprising an organic or an inorganic temperature resistant sheet material exhibiting heat resistance to temperature of at least about 600° C. and having a thickness of about 200 μm or less.

14. A secondary cell as defined in claim 13, wherein said first and second envelopes comprise a pair of opposed sheets of polyolefin material fused along three sides thereof to define an open side and said inner pocket.

15. A secondary cell as defined in claim 13, further comprising a housing for surrounding said plurality of stacked electrode assemblies and a nonaqueous electrolyte.

16. A secondary cell as defined in claim 1, wherein said plurality of stacked electrodes are wound in a spiral form.

17. A secondary cell as defined in claim 13, wherein said negative electrode comprises a copper foil collector having active material disposed on opposed sides thereon.

18. A secondary cell as defined in claim 17, wherein said active anode material comprises:

about 90% by weight of a non-graphitizable carbon material and about 10% by weight of a resin binder.

19. A secondary cell as defined in claim 13, wherein said positive electrode comprises an aluminum foil collector having active cathode material disposed on opposed sides thereof.

20. A secondary cell as defined in claim 19, wherein said active cathode material comprises about 91% by weight of a mixed powder containing about 95/5 w/w of $LiCoO_2$/$LiCo_3$; about 6% by weight graphite; and about 3% by weight of a resin binder.

* * * * *